United States Patent
Rasheed et al.

(10) Patent No.: US 9,666,942 B2
(45) Date of Patent: May 30, 2017

(54) ADAPTIVE TRANSMIT ARRAY FOR BEAM-STEERING

(71) Applicants: Irshad Rasheed, Fremont, CA (US); Christopher T. Schiller, Redding, CA (US)

(72) Inventors: Irshad Rasheed, Fremont, CA (US); Christopher T. Schiller, Redding, CA (US)

(73) Assignee: GIGPEAK, INC., San Jose, CA (US)

( * ) Notice: Subject to any disclaimer, the term of this patent is extended or adjusted under 35 U.S.C. 154(b) by 529 days.

(21) Appl. No.: 14/217,298

(22) Filed: Mar. 17, 2014

(65) Prior Publication Data

US 2014/0266893 A1    Sep. 18, 2014

Related U.S. Application Data

(60) Provisional application No. 61/801,624, filed on Mar. 15, 2013.

(51) Int. Cl.
*H01Q 3/00* (2006.01)
*H01Q 3/34* (2006.01)
(Continued)

(52) U.S. Cl.
CPC ............... *H01Q 3/34* (2013.01); *H04B 7/086* (2013.01); *G01S 19/37* (2013.01); *H01Q 3/26* (2013.01)

(58) Field of Classification Search
CPC . H01Q 3/26; H01Q 3/267; H01Q 3/34; G01S 19/35; G01S 19/36; G01S 19/37; H04B 7/086
(Continued)

(56) References Cited

U.S. PATENT DOCUMENTS

| 2,087,767 A | 7/1937 | Nathan H Schermer |
| 2,349,976 A | 5/1944 | Matsudaira |

(Continued)

FOREIGN PATENT DOCUMENTS

| CA | 2255347 A1 | 6/1999 |
| CA | 2340716 A1 | 3/2000 |

(Continued)

OTHER PUBLICATIONS

"An Active Integrated Retrodirective Transponder for Remote Information Retrieval-on-Demand", IEEE Transactions On Microwave Theory and Techniques, vol. 49, No. 9, Sep. 2001 by Ryan Y. Miyamoto et al. (pp. 5) http://www.mwlab.ee.ucla.edu/publications/2001c/mtt_trans/d.pdf.

(Continued)

*Primary Examiner* — Chuong P Nguyen
(74) *Attorney, Agent, or Firm* — Raj Abhyanker, P.C.

(57) ABSTRACT

A method includes receiving a remote transmitter signal at an antenna array including a number of antenna elements, mixing the received signal with in-phase and quadrature-phase Local Oscillator (LO) signals from Voltage Controlled Oscillators (VCOs) of a coupled VCO array, and configuring each Phase Locked Loop (PLL) of a number of PLLs to receive an in-phase output of the mixing corresponding to a VCO and a quadrature-phase output of the mixing corresponding to another VCO adjacent to the VCO as inputs thereto. The method also includes feeding back an output of the each PLL to the VCO, driving the in-phase and the quadrature-phase outputs of the mixing from a transmit modulator, and transmitting, in a direction of the remote transmitter, an antenna array signal based on the driving. Further, the method includes sensing a servoed state related to LO phase relationships and holding thereof during the transmission of the signal.

20 Claims, 7 Drawing Sheets

(51) Int. Cl.
*H04B 7/08* (2006.01)
*H01Q 3/26* (2006.01)
*G01S 19/37* (2010.01)

(58) Field of Classification Search
USPC .......................... 342/367, 368, 354, 357.75
See application file for complete search history.

(56) References Cited

U.S. PATENT DOCUMENTS

| | | |
|---|---|---|
| 2,810,906 A | 10/1957 | Lynch |
| 2,904,674 A | 9/1959 | Crawford |
| 3,036,211 A | 5/1962 | Broadhead, Jr. et al. |
| 3,193,767 A | 7/1965 | Schultz |
| 3,305,864 A | 2/1967 | Ghose |
| 3,328,714 A | 6/1967 | Hugenholtz |
| 3,344,355 A | 9/1967 | Massman |
| 3,422,436 A | 1/1969 | Marston |
| 3,422,437 A | 1/1969 | Marston |
| 3,433,960 A | 3/1969 | Minott |
| 3,460,145 A | 8/1969 | Johnson |
| 3,500,411 A | 3/1970 | Kiesling |
| 3,619,786 A | 11/1971 | Wilcox |
| 3,680,112 A | 7/1972 | Thomas |
| 3,754,257 A | 8/1973 | Coleman |
| 3,803,618 A | 4/1974 | Coleman |
| 3,838,423 A | 9/1974 | Di Matteo |
| 3,996,592 A | 12/1976 | Kline et al. |
| 4,001,691 A | 1/1977 | Gruenberg |
| 4,017,867 A | 4/1977 | Claus |
| 4,032,922 A | 6/1977 | Provencher |
| 4,090,199 A | 5/1978 | Archer |
| 4,112,430 A | 9/1978 | Ladstatter |
| 4,148,031 A | 4/1979 | Fletcher et al. |
| 4,188,578 A | 2/1980 | Reudink et al. |
| 4,189,733 A | 2/1980 | Malm |
| 4,214,244 A | 7/1980 | McKay et al. |
| 4,233,606 A | 11/1980 | Lovelace et al. |
| 4,270,222 A | 5/1981 | Menant |
| 4,277,787 A | 7/1981 | King |
| 4,315,262 A | 2/1982 | Acampora et al. |
| 4,404,563 A | 9/1983 | Richardson |
| 4,532,519 A | 7/1985 | Rudish et al. |
| 4,544,927 A | 10/1985 | Kurth et al. |
| 4,566,013 A | 1/1986 | Steinberg et al. |
| 4,649,373 A | 3/1987 | Bland et al. |
| 4,688,045 A | 8/1987 | Knudsen |
| 4,698,748 A | 10/1987 | Juzswik et al. |
| 4,722,083 A | 1/1988 | Tirro et al. |
| 4,736,463 A | 4/1988 | Chavez |
| 4,743,783 A | 5/1988 | Isbell et al. |
| 4,772,893 A | 9/1988 | Iwasaki |
| 4,792,991 A | 12/1988 | Eness |
| 4,806,938 A | 2/1989 | Meadows |
| 4,827,268 A | 5/1989 | Rosen |
| 4,882,589 A | 11/1989 | Reisenfeld |
| 4,901,085 A | 2/1990 | Spring et al. |
| 4,956,643 A | 9/1990 | Hahn, III et al. |
| 4,965,602 A | 10/1990 | Kahrilas et al. |
| 5,001,776 A | 3/1991 | Clark |
| 5,012,254 A | 4/1991 | Thompson |
| 5,027,126 A | 6/1991 | Basehgi et al. |
| 5,028,931 A | 7/1991 | Ward |
| 5,034,752 A | 7/1991 | Pourailly et al. |
| 5,041,836 A | 8/1991 | Paschen et al. |
| 5,084,708 A | 1/1992 | Champeau et al. |
| 5,093,668 A | 3/1992 | Sreenivas |
| 5,107,273 A | 4/1992 | Roberts |
| 5,128,687 A | 7/1992 | Fay |
| 5,166,690 A | 11/1992 | Carlson et al. |
| 5,173,701 A | 12/1992 | Dijkstra |
| 5,179,724 A | 1/1993 | Lindoff |
| 5,243,415 A | 9/1993 | Vance |
| 5,274,836 A | 12/1993 | Lux |
| 5,276,449 A | 1/1994 | Walsh |
| 5,347,546 A | 9/1994 | Abadi et al. |
| 5,349,688 A | 9/1994 | Nguyen |
| 5,359,329 A | 10/1994 | Lewis et al. |
| 5,369,771 A | 11/1994 | Gettel |
| 5,375,146 A | 12/1994 | Chalmers |
| 5,396,635 A | 3/1995 | Fung |
| 5,408,668 A | 4/1995 | Tornai |
| 5,434,578 A | 7/1995 | Stehlik |
| 5,457,365 A | 10/1995 | Blagaila et al. |
| 5,481,570 A | 1/1996 | Winters |
| 5,486,726 A | 1/1996 | Kim et al. |
| 5,497,162 A | 3/1996 | Kaiser |
| 5,523,764 A | 6/1996 | Martinez et al. |
| 5,539,415 A | 7/1996 | Metzen et al. |
| 5,560,020 A | 9/1996 | Nakatani et al. |
| 5,560,024 A | 9/1996 | Harper et al. |
| 5,564,094 A | 10/1996 | Anderson et al. |
| 5,583,511 A | 12/1996 | Hulderman |
| 5,592,178 A | 1/1997 | Chang et al. |
| 5,594,460 A | 1/1997 | Eguchi |
| 5,617,572 A | 4/1997 | Pearce et al. |
| 5,666,365 A | 9/1997 | Kostreski |
| 5,697,081 A | 12/1997 | Lyall, Jr. et al. |
| 5,710,929 A | 1/1998 | Fung |
| 5,712,641 A | 1/1998 | Casabona et al. |
| 5,748,048 A | 5/1998 | Moyal |
| 5,754,138 A | 5/1998 | Turcotte et al. |
| 5,787,294 A | 7/1998 | Evoy |
| 5,790,070 A | 8/1998 | Natarajan et al. |
| 5,799,199 A | 8/1998 | Ito et al. |
| 5,822,597 A | 10/1998 | Kawano et al. |
| 5,867,063 A | 2/1999 | Snider et al. |
| 5,869,970 A | 2/1999 | Palm et al. |
| 5,870,685 A | 2/1999 | Flynn |
| 5,909,460 A | 6/1999 | Dent |
| 5,952,965 A | 9/1999 | Kowalski |
| 5,959,578 A | 9/1999 | Kreutel, Jr. |
| 5,966,371 A | 10/1999 | Sherman |
| 5,987,614 A | 11/1999 | Mitchell et al. |
| 6,006,336 A | 12/1999 | Watts, Jr. et al. |
| 6,009,124 A | 12/1999 | Smith et al. |
| 6,026,285 A | 2/2000 | Lyall, Jr. et al. |
| 6,061,385 A | 5/2000 | Ostman |
| 6,079,025 A | 6/2000 | Fung |
| 6,084,540 A | 7/2000 | Yu |
| 6,111,816 A | 8/2000 | Chiang et al. |
| 6,127,815 A | 10/2000 | Wilcox |
| 6,127,971 A | 10/2000 | Calderbank et al. |
| 6,144,705 A | 11/2000 | Papadopoulos et al. |
| 6,166,689 A | 12/2000 | Dickey, Jr. et al. |
| 6,167,286 A | 12/2000 | Ward et al. |
| 6,169,522 B1 | 1/2001 | Ma et al. |
| 6,175,719 B1 | 1/2001 | Sarraf et al. |
| 6,272,317 B1 | 8/2001 | Houston et al. |
| 6,298,221 B1 | 10/2001 | Nguyen |
| 6,317,411 B1 | 11/2001 | Whinnett et al. |
| 6,320,896 B1 | 11/2001 | Jovanovich et al. |
| 6,336,030 B2 | 1/2002 | Houston |
| 6,397,090 B1 | 5/2002 | Cho |
| 6,463,295 B1 | 10/2002 | Yun |
| 6,473,016 B2 | 10/2002 | Piirainen et al. |
| 6,473,037 B2 | 10/2002 | Vail et al. |
| 6,480,522 B1 | 11/2002 | Hoole et al. |
| 6,501,415 B1 | 12/2002 | Viana et al. |
| 6,509,865 B2 | 1/2003 | Takai |
| 6,523,123 B1 | 2/2003 | Barbee |
| 6,529,162 B2 | 3/2003 | Newberg et al. |
| 6,587,077 B2 | 7/2003 | Vail et al. |
| 6,598,009 B2 | 7/2003 | Yang |
| 6,630,905 B1 | 10/2003 | Newberg et al. |
| 6,646,599 B1 | 11/2003 | Apa et al. |
| 6,653,969 B1 | 11/2003 | Birleson |
| 6,661,366 B2 | 12/2003 | Yu |
| 6,661,375 B2 | 12/2003 | Rickett et al. |
| 6,671,227 B2 | 12/2003 | Gilbert et al. |
| 6,697,953 B1 | 2/2004 | Collins |
| 6,707,419 B2 | 3/2004 | Woodington et al. |
| 6,768,456 B1 | 7/2004 | Lalezari et al. |
| 6,771,220 B1 | 8/2004 | Ashe et al. |
| 6,778,137 B2 | 8/2004 | Krikorian et al. |

(56) References Cited

U.S. PATENT DOCUMENTS

| | | |
|---|---|---|
| 6,788,250 B2 | 9/2004 | Howell |
| 6,816,977 B2 | 11/2004 | Brakmo et al. |
| 6,822,522 B1 | 11/2004 | Brown et al. |
| 6,833,766 B2 | 12/2004 | Kim et al. |
| 6,870,503 B2 | 3/2005 | Mohamadi |
| 6,873,289 B2 | 3/2005 | Kwon et al. |
| 6,885,974 B2 | 4/2005 | Holle |
| 6,947,775 B2 | 9/2005 | Okamoto et al. |
| 6,960,962 B2 | 11/2005 | Peterzell et al. |
| 6,977,610 B2 | 12/2005 | Brookner et al. |
| 6,980,786 B1 | 12/2005 | Groe |
| 6,989,787 B2 | 1/2006 | Park et al. |
| 6,992,992 B1 | 1/2006 | Cooper et al. |
| 7,006,039 B2 | 2/2006 | Miyamoto et al. |
| 7,010,330 B1 | 3/2006 | Tsividis |
| 7,013,165 B2 | 3/2006 | Yoon et al. |
| 7,016,654 B1 | 3/2006 | Bugeja |
| 7,035,613 B2 | 4/2006 | Dubash et al. |
| 7,039,442 B1 | 5/2006 | Joham et al. |
| 7,062,302 B2 | 6/2006 | Yamaoka |
| 7,103,383 B2 | 9/2006 | Ito |
| 7,109,918 B1 | 9/2006 | Meadows et al. |
| 7,109,919 B2 | 9/2006 | Howell |
| 7,110,732 B2 | 9/2006 | Mostafa et al. |
| 7,126,542 B2 | 10/2006 | Mohamadi |
| 7,126,554 B2 | 10/2006 | Mohamadi |
| 7,154,346 B2 | 12/2006 | Jaffe et al. |
| 7,196,590 B1 | 3/2007 | In et al. |
| 7,245,269 B2 | 7/2007 | Sievenpiper et al. |
| 7,304,607 B2 | 12/2007 | Miyamoto et al. |
| 7,312,750 B2 | 12/2007 | Mao et al. |
| 7,327,313 B2 | 2/2008 | Hemmi et al. |
| 7,340,623 B2 | 3/2008 | Kato et al. |
| 7,379,515 B2 | 5/2008 | Johnson et al. |
| 7,382,202 B2 | 6/2008 | Jaffe et al. |
| 7,382,314 B2 | 6/2008 | Liao et al. |
| 7,382,743 B1 | 6/2008 | Rao et al. |
| 7,421,591 B2 | 9/2008 | Sultenfuss et al. |
| 7,440,766 B1 | 10/2008 | Tuovinen et al. |
| 7,463,191 B2 | 12/2008 | Dybdal et al. |
| 7,482,975 B2 | 1/2009 | Kimata |
| 7,501,959 B2 | 3/2009 | Shirakawa |
| 7,508,950 B2 | 3/2009 | Danielsen |
| 7,522,885 B2 | 4/2009 | Parssinen et al. |
| 7,529,443 B2 | 5/2009 | Holmstrom et al. |
| 7,558,548 B2 | 7/2009 | Konchistky |
| 7,570,124 B2 | 8/2009 | Haralabidis |
| 7,574,617 B2 | 8/2009 | Park |
| 7,620,382 B2 | 11/2009 | Yamamoto |
| 7,663,546 B1 | 2/2010 | Miyamoto et al. |
| 7,664,533 B2 | 2/2010 | Logothetis et al. |
| 7,710,319 B2 | 5/2010 | Nassiri-Toussi et al. |
| 7,728,769 B2 | 6/2010 | Chang et al. |
| 7,742,000 B2 | 6/2010 | Mohamadi |
| 7,760,122 B1 | 7/2010 | Zortea |
| 7,812,775 B2 | 10/2010 | Babakhani et al. |
| 7,848,719 B2 | 12/2010 | Krishnaswamy et al. |
| 7,861,098 B2 | 12/2010 | Theocharous et al. |
| 7,912,517 B2 | 3/2011 | Park |
| 7,925,208 B2 | 4/2011 | Sarraf et al. |
| 7,934,107 B2 | 4/2011 | Walrath |
| 7,944,396 B2 | 5/2011 | Brown et al. |
| 7,979,049 B2 | 7/2011 | Oredsson et al. |
| 7,982,651 B1 | 7/2011 | Zortea |
| 7,982,669 B2 | 7/2011 | Nassiri-Toussi et al. |
| 7,991,437 B2 | 8/2011 | Camuffo et al. |
| 8,005,437 B2 | 8/2011 | Rofougaran |
| 8,031,019 B2 | 10/2011 | Chawla et al. |
| 8,036,164 B1 | 10/2011 | Winters et al. |
| 8,036,719 B2 | 10/2011 | Ying |
| 8,063,996 B2 | 11/2011 | Du Val et al. |
| 8,072,380 B2 | 12/2011 | Crouch |
| 8,078,110 B2 | 12/2011 | Li et al. |
| 8,102,313 B2 | 1/2012 | Guenther et al. |
| 8,112,646 B2 | 2/2012 | Tsai |
| 8,126,417 B2 | 2/2012 | Saito |
| 8,138,841 B2 | 3/2012 | Wan et al. |
| 8,156,353 B2 | 4/2012 | Tsai |
| 8,165,185 B2 | 4/2012 | Zhang et al. |
| 8,165,543 B2 | 4/2012 | Rohit et al. |
| 8,170,503 B2 | 5/2012 | Oh et al. |
| 8,174,328 B2 | 5/2012 | Park et al. |
| 8,184,052 B1 | 5/2012 | Wu et al. |
| 8,222,933 B2 | 7/2012 | Nagaraj |
| 8,248,203 B2 | 8/2012 | Hanwright et al. |
| 8,265,646 B2 | 9/2012 | Agarwal |
| 8,290,020 B2 | 10/2012 | Liu et al. |
| 8,305,190 B2 | 11/2012 | Moshfeghi |
| 8,325,089 B2 | 12/2012 | Rofougaran |
| 8,340,015 B1 | 12/2012 | Miller et al. |
| 8,344,943 B2 | 1/2013 | Brown et al. |
| 8,373,510 B2 | 2/2013 | Kelkar |
| 8,396,107 B2 | 3/2013 | Gaur |
| 8,400,356 B2 | 3/2013 | Paynter |
| 8,417,191 B2 | 4/2013 | Xia et al. |
| 8,428,535 B1 | 4/2013 | Cousinard et al. |
| 8,432,805 B2 | 4/2013 | Agarwal |
| 8,446,317 B1 | 5/2013 | Wu et al. |
| 8,456,244 B2 | 6/2013 | Obkircher et al. |
| 8,466,776 B2 | 6/2013 | Fink et al. |
| 8,466,832 B2 | 6/2013 | Afshari et al. |
| 8,472,884 B2 | 6/2013 | Ginsburg et al. |
| 8,509,144 B2 | 8/2013 | Miller et al. |
| 8,532,236 B2 * | 9/2013 | Kerth .................. H04B 1/0003 375/306 |
| 8,542,629 B2 | 9/2013 | Miller |
| 8,558,625 B1 | 10/2013 | Lie et al. |
| 8,565,358 B2 | 10/2013 | Komaili et al. |
| 8,571,127 B2 | 10/2013 | Jiang et al. |
| 8,604,976 B2 | 12/2013 | Chang et al. |
| 8,644,780 B2 | 2/2014 | Tohoku |
| 8,654,262 B2 | 2/2014 | Du Val et al. |
| 8,660,497 B1 | 2/2014 | Zhang et al. |
| 8,660,500 B2 | 2/2014 | Rofougaran et al. |
| 8,700,923 B2 | 4/2014 | Fung |
| 8,761,755 B2 | 6/2014 | Karaoguz |
| 8,762,751 B2 | 6/2014 | Rodriguez et al. |
| 8,781,426 B2 | 7/2014 | Ciccarelli et al. |
| 8,786,376 B2 | 7/2014 | Voinigescu et al. |
| 8,788,103 B2 | 7/2014 | Warren |
| 8,792,896 B2 | 7/2014 | Ahmad et al. |
| 8,797,212 B1 | 8/2014 | Wu et al. |
| 8,805,275 B2 | 8/2014 | O'Neill et al. |
| 8,832,468 B2 | 9/2014 | Pop et al. |
| 8,843,094 B2 | 9/2014 | Ahmed et al. |
| 9,041,602 B2 * | 5/2015 | McCune, Jr. ........ H01Q 3/2605 342/372 |
| 9,184,498 B2 * | 11/2015 | Schiller .................. H01Q 3/40 |
| 2001/0038318 A1 | 11/2001 | Johnson et al. |
| 2002/0084934 A1 | 7/2002 | Vail et al. |
| 2002/0159403 A1 | 10/2002 | Reddy |
| 2002/0175859 A1 | 11/2002 | Newberg et al. |
| 2002/0177475 A1 | 11/2002 | Park |
| 2002/0180639 A1 | 12/2002 | Rickett et al. |
| 2003/0003887 A1 | 1/2003 | Lim et al. |
| 2003/0034916 A1 | 2/2003 | Kwon et al. |
| 2004/0043745 A1 | 3/2004 | Najarian et al. |
| 2004/0095287 A1 | 5/2004 | Mohamadi |
| 2004/0166801 A1 | 8/2004 | Sharon et al. |
| 2004/0192376 A1 | 9/2004 | Grybos |
| 2004/0263408 A1 | 12/2004 | Sievenpiper et al. |
| 2005/0012667 A1 | 1/2005 | Noujeim |
| 2005/0030226 A1 | 2/2005 | Miyamoto et al. |
| 2005/0116864 A1 | 6/2005 | Mohamadi |
| 2005/0117720 A1 | 6/2005 | Goodman et al. |
| 2005/0197060 A1 | 9/2005 | Hedinger et al. |
| 2005/0206564 A1 | 9/2005 | Mao et al. |
| 2005/0208919 A1 | 9/2005 | Walker et al. |
| 2005/0215274 A1 | 9/2005 | Matson et al. |
| 2006/0003722 A1 | 1/2006 | Tuttle et al. |
| 2006/0063490 A1 | 3/2006 | Bader et al. |
| 2006/0262013 A1 | 11/2006 | Shiroma et al. |
| 2006/0281430 A1 | 12/2006 | Yamamoto |
| 2007/0047669 A1 | 3/2007 | Mak et al. |

(56) References Cited

U.S. PATENT DOCUMENTS

| | | |
|---|---|---|
| 2007/0098320 A1 | 5/2007 | Holmstrom et al. |
| 2007/0099588 A1 | 5/2007 | Konchistky |
| 2007/0123186 A1 | 5/2007 | Asayama et al. |
| 2007/0135051 A1 | 6/2007 | Zheng et al. |
| 2007/0142089 A1 | 6/2007 | Roy |
| 2007/0173286 A1 | 7/2007 | Carter et al. |
| 2007/0298742 A1 | 12/2007 | Ketchum et al. |
| 2008/0001812 A1 | 1/2008 | Jalali |
| 2008/0039042 A1 | 2/2008 | Ciccarelli et al. |
| 2008/0045153 A1 | 2/2008 | Surineni et al. |
| 2008/0063012 A1 | 3/2008 | Nakao et al. |
| 2008/0075058 A1 | 3/2008 | Mundarath et al. |
| 2008/0091965 A1 | 4/2008 | Nychka et al. |
| 2008/0129393 A1 | 6/2008 | Rangan et al. |
| 2008/0218429 A1 | 9/2008 | Johnson et al. |
| 2008/0233865 A1 | 9/2008 | Malarky et al. |
| 2008/0240031 A1 | 10/2008 | Nassiri-Toussi et al. |
| 2009/0023384 A1 | 1/2009 | Miller |
| 2009/0143038 A1 | 6/2009 | Saito |
| 2009/0153253 A1 | 6/2009 | Mei |
| 2009/0160707 A1 | 6/2009 | Lakkis |
| 2009/0286482 A1 | 11/2009 | Gorokhov et al. |
| 2010/0100751 A1 | 4/2010 | Guo et al. |
| 2010/0259447 A1 | 10/2010 | Crouch |
| 2010/0302980 A1 | 12/2010 | Ji et al. |
| 2011/0084879 A1 | 4/2011 | Brown et al. |
| 2011/0095794 A1 | 4/2011 | Dubost et al. |
| 2011/0140746 A1 | 6/2011 | Park et al. |
| 2011/0188597 A1 | 8/2011 | Agee et al. |
| 2011/0221396 A1 | 9/2011 | Glauning |
| 2011/0235748 A1 | 9/2011 | Kenington |
| 2011/0273210 A1 | 11/2011 | Nagaraj |
| 2011/0285593 A1 | 11/2011 | Cavirani et al. |
| 2012/0004005 A1 | 1/2012 | Ahmed et al. |
| 2012/0013507 A1 | 1/2012 | Fusco |
| 2012/0026970 A1 | 2/2012 | Winters et al. |
| 2012/0092211 A1 | 4/2012 | Hampel et al. |
| 2012/0190378 A1 | 7/2012 | Han et al. |
| 2012/0200327 A1 | 8/2012 | Sreekiran et al. |
| 2012/0235716 A1 | 9/2012 | Dubost et al. |
| 2012/0235857 A1 | 9/2012 | Kim et al. |
| 2012/0280730 A1 | 11/2012 | Obkircher et al. |
| 2012/0284543 A1 | 11/2012 | Xian et al. |
| 2012/0319734 A1 | 12/2012 | Nagaraj et al. |
| 2013/0002472 A1 | 1/2013 | Crouch |
| 2013/0039348 A1 | 2/2013 | Hu et al. |
| 2013/0047017 A1 | 2/2013 | Lin et al. |
| 2013/0093624 A1* | 4/2013 | Raczkowski ............ H01Q 3/42 342/368 |
| 2013/0095873 A1 | 4/2013 | Soriaga et al. |
| 2013/0154695 A1 | 6/2013 | Abbasi et al. |
| 2013/0176171 A1 | 7/2013 | Webber et al. |
| 2013/0234889 A1 | 9/2013 | Hwang et al. |
| 2013/0241612 A1 | 9/2013 | Obkircher et al. |
| 2013/0322197 A1 | 12/2013 | Schiller et al. |
| 2013/0339764 A1 | 12/2013 | Lee et al. |
| 2014/0085011 A1 | 3/2014 | Choi et al. |
| 2014/0097986 A1* | 4/2014 | Xue ............ H01Q 3/34 342/372 |
| 2014/0120845 A1 | 5/2014 | Laskar |
| 2014/0120848 A1 | 5/2014 | Laskar |
| 2014/0266471 A1 | 9/2014 | Zhu et al. |
| 2014/0266889 A1* | 9/2014 | Schiller ............ H01Q 3/42 342/367 |
| 2014/0266890 A1* | 9/2014 | Schiller ............ H01Q 3/42 342/367 |
| 2014/0266891 A1* | 9/2014 | Schiller ............ H01Q 3/42 342/367 |
| 2014/0266892 A1* | 9/2014 | Schiller ............ H01Q 3/42 342/367 |
| 2014/0266893 A1 | 9/2014 | Rasheed et al. |
| 2014/0266894 A1* | 9/2014 | Rasheed ............ H01Q 3/34 342/367 |
| 2014/0273817 A1 | 9/2014 | Schiller |

FOREIGN PATENT DOCUMENTS

| | | |
|---|---|---|
| EP | 0305099 A2 | 3/1989 |
| EP | 0754355 B1 | 6/2000 |
| EP | 1047216 A2 | 10/2000 |
| EP | 1261064 A1 | 11/2002 |
| EP | 1267444 A2 | 12/2002 |
| EP | 1672468 A2 | 6/2006 |
| EP | 2003799 A1 | 12/2008 |
| EP | 2151924 A1 | 2/2010 |
| EP | 2456079 A2 | 5/2012 |
| WO | 8601057 A1 | 2/1986 |
| WO | 8706072 A1 | 10/1987 |
| WO | 9107024 A1 | 5/1991 |
| WO | 9414178 A1 | 6/1994 |
| WO | 9721284 A1 | 6/1997 |
| WO | 9832245 A1 | 7/1998 |
| WO | 9916221 A1 | 4/1999 |
| WO | 0051202 A1 | 8/2000 |
| WO | 0055986 A1 | 9/2000 |
| WO | 0074170 A2 | 12/2000 |
| WO | 0117065 A1 | 3/2001 |
| WO | 0198839 A2 | 12/2001 |
| WO | 03023438 A2 | 3/2003 |
| WO | 03038513 A2 | 5/2003 |
| WO | 03041283 A2 | 5/2003 |
| WO | 03079043 A2 | 9/2003 |
| WO | 2004021541 A1 | 3/2004 |
| WO | 2004082197 A2 | 9/2004 |
| WO | 2006133225 A2 | 12/2006 |
| WO | 2007130442 A2 | 11/2007 |
| WO | 2010024539 A2 | 3/2010 |
| WO | 2010073241 A2 | 7/2010 |
| WO | 2011008146 A1 | 1/2011 |
| WO | 2012035309 A1 | 3/2012 |
| WO | 2014057329 A2 | 4/2014 |
| WO | 2014150615 A1 | 9/2014 |
| WO | 2014151933 A2 | 9/2014 |

OTHER PUBLICATIONS

"Ongoing retro directive Array Research at UCLA", The Institute of electrical Information and communication Engineers, by Kevin M.K.H. Leong et al. (pp. 6) http://www.ieice.org/~wpt/paper/SPS02-08.pdf.

"Digital communications using self-phased arrays", Jet Propulsion Lab., California Inst. of Technology, Pasadena, CA, USA, IEEE Xplore, vol. 49, Issue 4, Apr. 2001 by L.D. DiDomenico et al. (p. 1) http://ieeexplore.ieee.org/xpl/login.jsp?tp=&arnumber=915442&url=http%3A%2F%2Fieeexplore.ieee.org%2Fxpls%2Fabs_all.jsp%3Farnumber%3D915442.

"Large Active Retrodirective Arrays for Space Applications", NASA Technical Documents, Jan. 15, 1978 by R. C Chernoff (p. 1) https://archive.org/details/nasa_techdoc_19780013390.

"Beam Steering in Smart Antennas by Using Low Complex Adaptive Algorithms", International Journal of Research in Engineering and Technology, vol. 02 Issue: 10, Oct. 2013 by Amarnadh Poluri et al. (pp. 7) http://ijret.org/Volumes/V02/I10/IJRET_110210085.pdf.

"Efficient Adaptive Beam Steering Using INLMS Algorithm for Smart Antenna", ECE Department, QIS College of Engineering and Technology, Ongole, India, Jul. 22, 2012 by E. Anji Naik et al. (pp. 5) http://www.irnetexplore.ac.in/IRNetExplore_Proceedings/Vijayawada/AEEE/AEEE_22ndJuly2012/AEEE_22ndJuly2012_doc/paper3.pdf.

"A Primer on Digital Beamforming", Mar. 26, 1998 by Toby Haynes (pp. 15) http://www.spectrumsignal.com/publications/beamform_primer.pdf.

"Design of Beam Steering Antenna Array for RFID Reader Using Fully Controlled RF Switches", Mobile and Satellite Communications Research Centre University of Bradford by D. Zhou et al. (pp. 7).

"Electronically steerable passive array radiator antennas for low-cost analog adaptive beamforming", ATR Adaptive Commun. Res. Labs., Kyoto, Japan, IEEE Xplore, 2000 by T. Ohira et al. (p. 1)

(56) References Cited

OTHER PUBLICATIONS http://ieeexplore.ieee.org/xpl/articleDetails.jsp?tp=&arnumber=858918&url=http%3A%2F%2Fieeexplore.ieee.org%2Fxpls%2Fabs_all.jsp%3Farnumber%3D858918.

"Sector-mode beamforming of a 2.4-GHz electronically steerable passive array radiator antenna for a wireless ad hoc network", ATR Adaptive Commun. Res. Labs., Kyoto, Japan, IEEE Xplore, 2002 by Jun Cheng et al. (p. 1) http://ieeexplore.ieee.org/xpl/articleDetails.jsp?arnumber=1016265.

"Design of electronically steerable passive array radiator (ESPAR) antennas", ATR Adaptive Commun. Res. Lab., Kyoto, Japan, IEEE Xplore, 2000 by K. Gyoda et al. (p. 1) http://ieeexplore.ieee.org/xpl/articleDetails.jsp?arnumber=875370.

"A low complex adaptive algorithm for antenna beam steering", Dept. of Electron. & Communication Engineering, Narasaraopeta Eng. Collage, Narasaraopeta, India , IEEE Xplore, 2011 by M.Z.U. Rahman et al. (p. 1) http://ieeexplore.ieee.org/xpl/login.jsp?tp=&arnumber=6024567&url=http%3A%2F%2Fieeexplore.ieee.org%2Fxpls%2Fabs_all.jsp%3Farnumber%3D6024567.

"Receiver Front-End Architectures—Analysis and Evaluation", Mar. 1, 2010 by Pedro Cruz et al. (pp. 27) http://cdn.intechopen.com/pdfs-wm/9961.pdf.

"An injection-locking scheme for precision quadrature generation", CeLight Inc., Iselin, NJ, USA, Solid-State Circuits, IEEE Xplore, vol. 37, Issue 7, Jul. 2002 by P. Kinget et al. (p. 1) http://ieeexplore.ieee.org/xpl/login.jsp?tp=&arnumber=1015681&url=http%3A%2F%2Fieeexplore.ieee.org%2Fxpls%2Fabs_all.jsp%3Farnumber%3D1015681.

"The Fundamentals Of Signal Generation", Agilent Technologies, Electronic Design, Jan. 24, 2013 by Erik Diez (pp. 12) http://electronicdesign.com/test-amp-measurement/fundamentals-signal-generation.

"A mixed-signal sensor interface microinstrument", Sensors and Actuators A: Physical, Science Direct, vol. 91, Issue 3, Jul. 15, 2001 by Keith L. Kraver et al. (p. 2) http://www.sciencedirect.com/science/article/pii/S0924424701005969.

"An Analysis of Power Consumption in a Smartphone", NICTA, University of New South Wales, 2010 by Aaron Carroll, (pp. 14) https://www.usenix.org/legacy/event/usenix10/tech/full_papers/Carroll.pdf.

"Standby Consumption In Households State Of The Art And Possibilities For Reduction For Home Electronics", Delft, The Netherlands (pp. 8) http://standby.lbl.gov/pdf/siderius.html.

"Wake on Wireless: An Event Driven Energy Saving Strategy for Battery Operated Devices", Massachusetts Institute of Technology Cambridge, 2002 by Eugene Shih et al. (pp. 12) http://research.microsoft.com/en-us/um/people/bahl/Papers/Pdf/mobicom02.pdf.

"Reducing Leaking Electricity To 1 Watt" National Laboratory, Berkeley, CA, Aug. 28, 1998 by Alan Meier et al. (pp. 10) http://standby.lbl.gov/pdf/42108.html.

"Reducing Power in High-performance Microprocessors", Intel Corporation,Santa Clara CA. 1998 by Vivek Tiwari et al. (p. 1) http://dl.acm.org/citation.cfm?id=277227.

"Simulating the Power Consumption of Large-Scale Sensor Network Applications", Division of Engineering and Applied Sciences,Harvard University, by Victor Shnayder et al. (pp. 13) http://web.stanford.edu/class/cs344a/papers/sensys04ptossim.pdf.

"Distributed Transmit Beamforming:Challenges and Recent Progress", University of California at Santa Barbara, 2009 by Raghuraman Mudumbai et al. (pp. 9) http://spinlab.wpi.edu/pubs/Mudumbai_COMMAG_2009.pdf.

"Design and Simulation of a Low Cost Digital Beamforming (DBF) Receiver for Wireless Communication",International Journal of Innovative Technology and Exploring Engineering (IJITEE), vol. 2, Jan. 2, 2013 by V.N Okorogu (pp. 8) http://www.ijitee.org/attachments/File/v2i2/B0351012213.pdf.

"Frequency multiplication techniques for Sub-harmonic injection locking of LC oscillators and Its application to phased-array architectures", Ottawa-Carleton Institute for Electrical and Computer Engineering, 2013 by Yasser Khairat Soliman (pp. 2) https://curve.carleton.ca/system/files/theses/27532.pdf.

"Active Integrated Antennas", Transactions on microwave theory and techniques, vol. No. 50, No. 3, Mar. 2002, by Kai Chang et al. (pp. 8) http://www.cco.caltech.edu/~mmic/reshpubindex/MURI/MURI03/York2.pdf.

"Low cost and compact active integrated antenna transceiver for system applications", Dept. of Electronics Engineers, Texas A&M University, College Station, Texas, USA, Oct. 1996 by R.A. Flynt et al. (p. 1) http://ieeexplore.ieee.org/xpl/login.jsp?tp=&arnumber=538955&url=http%3A%2F%2Fieeexplore.ieee.org%2Fxpls%2Fabs_all.jsp%3Farnumber%3D538955.

"Phased array and adaptive antenna transceivers in wireless sensor networks", Institute of Microsystem Technology—IMTEK, Albert-Ludwig-University, Freiburg, Germany, 2004 by Ruimin Huang et al. (pp. 1) http://ieeexplore.ieee.org/xpl/login.jsp?tp=&arnumber=1333329&url=http%3A%2F%2Fieeexplore.ieee.org%2Fxpls%2Fabs_all.jsp%3Farnumber%3D1333329.

"On the Feasibility of Distributed Beamforming in Wireless Networks", IEEE transactions on wireless communications, vol. 6,No. 5, May 2007 by R. Mudumbai. (pp. 10) https://research.engineering.uiowa.edu/wrl/sites/research.engineering.uiowa.edu.wrl/files/attachments/TWICOM07_0.pdf.

"Antenna Systems For Radar Applications Information Technology Essay", (pp. 15) http://www.ukessays.com/essays/information-technology/antenna-systems-for-radar-applications-information-technology-essay.php.

"Smart antennas control circuits for automotive communications", Mar. 28, 2012, by David Cordeau et al. (pp. 10) https://hal.archives-ouvertes.fr/file/index/docid/683344/filename/Cordeau_Paillot.pdf.

"Adaptive Beam Steering Of RLSA Antenna With RFID Technonlogy", Progress In Electromagnetics Research, vol. 108, Jul. 19, 2010 by M. F. Jamlos et al. (pp. 16) http://jpier.org/PIER/pier108/05.10071903.pdf.

"Retrodirective arrays for wireless communications", Microwave Magzine, IEEE Xplore, vol. 3,Issue 1, Mar. 2002 by R.Y. Miyamoto et al. (p. 1) http://ieeexplore.ieee.org/xpl/login.jsp?tp=&arnumber=990692&url=http%3A%2F%2Fieeexplore.ieee.org%2Fxpls%2Fabs_all.jsp%3Farnumber%3D990692.

\* cited by examiner

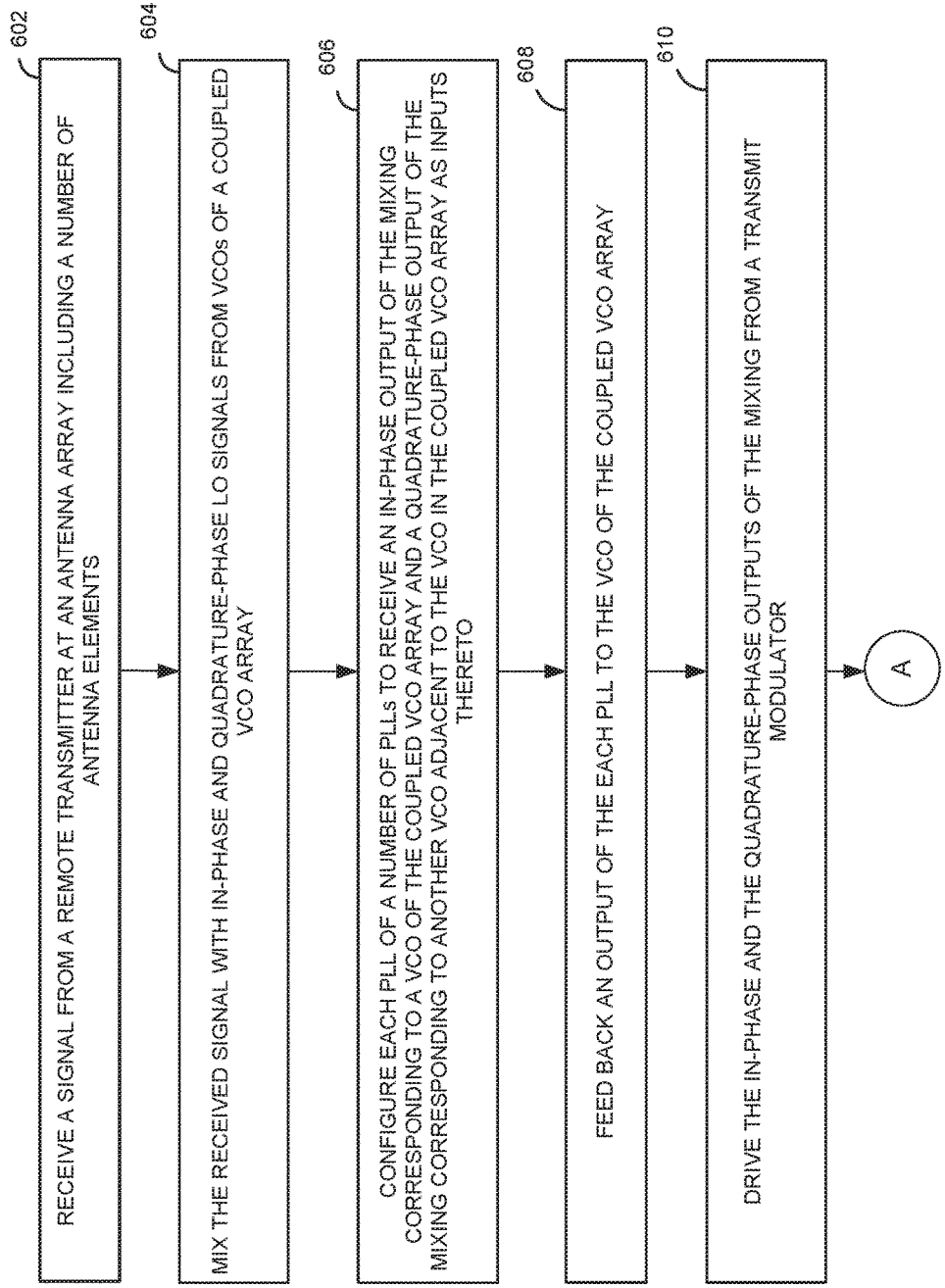

ADAPTIVE TRANSMIT ARRAY FOR BEAM-STEERING

CLAIM OF PRIORITY

This application is a conversion application of the U.S. provisional patent application Ser. No. 61/801,624 titled ADAPTIVE TRANSMIT ARRAY FOR BEAM-STEERING filed on Mar. 15, 2013

FIELD OF TECHNOLOGY

This disclosure generally relates to beam-steering and, more specifically, to a method, a circuit and/or a system of an adaptive transmit array for beam-steering.

BACKGROUND

Modern systems such as wireless, phased array, communication, radar, Global Positioning System (GPS) and signal gathering systems may require control and/or maintenance of a direction of a beam. The aforementioned systems may require costly physical alignment of antenna systems thereof; in the case of electronic beam-steering antenna systems, a high level of circuit and processing complexity may be required, in addition to constant monitoring.

A servo system utilized to determine the direction of a remote transmitter and then to transmit Radio Frequency (RF) signals back at the remote transmitter may require complete down-conversion and digital signal processing, which is time consuming and costly in terms of circuitry and power.

SUMMARY

Disclosed are a method, a circuit and/or a system of an adaptive transmit array for beam-steering.

In one aspect, a method includes receiving a signal from a remote transmitter at an antenna array including a number of antenna elements, mixing the received signal with in-phase and quadrature-phase Local Oscillator (LO) signals from Voltage Controlled Oscillators (VCOs) of a coupled VCO array, and configuring each Phase Locked Loop (PLL) of a number of PLLs to receive an in-phase output of the mixing corresponding to a VCO of the coupled VCO array and a quadrature-phase output of the mixing corresponding to another VCO adjacent to the VCO in the coupled VCO array as inputs thereto. The method also includes feeding back an output of the each PLL to the VCO of the coupled VCO array, and driving the in-phase and the quadrature-phase outputs of the mixing from in-phase and quadrature-phase outputs of a transmit modulator instead of the each PLL being driven by the in-phase and the quadrature-phase output of the mixing.

Further, the method includes transmitting, in a direction of the remote transmitter, a signal from the antenna array based on the driving of the in-phase and the quadrature-phase outputs of the mixing from the transmit modulator, and sensing a servoed state related to phase relationships between the LO signals and holding the servoed state through a sample and hold circuit coupled in a feedback path between the output of the each PLL and the VCO during the transmission of the signal in the direction of the remote transmitter.

In another aspect, a beam-steering system includes an antenna array including a number of antenna elements. The antenna array is configured to receive a signal from a remote transmitter thereat. The beam-steering system also includes a coupled VCO array including a number of VCOs coupled to one another, a number of mixers, a number of PLLs and a number of sample and hold circuits. Each mixer of the number of mixers is configured to mix the received signal at an antenna element with an in-phase and a quadrature-phase LO signal from a particular VCO of the coupled VCO array. Each PLL of the number of PLLs is configured to receive an in-phase output of the each mixer corresponding to the particular VCO and a quadrature-phase output of a mixer corresponding to another VCO adjacent to the particular VCO as inputs thereto.

An output of the each PLL is fed back to the particular VCO. The in-phase and the quadrature-phase outputs of the number of mixers are configured to be driven from in-phase and quadrature-phase outputs of a transmit modulator instead of the number of PLLs being driven by the in-phase and the quadrature-phase outputs of the number of mixers. The antenna array is configured to transmit a signal in a direction of the remote transmitter based on the driving of the in-phase and the quadrature-phase outputs of the number of mixers from the transmit modulator. Each sample and hold circuit of the number of sample and hold circuits is configured to sense a servoed state related to phase relationships between LO signals from VCOs of the coupled VCO array and hold the servoed state during the transmission of the signal in the direction of the remote transmitter. The each sample and hold circuit is coupled in a feedback path between the output of the each PLL and the particular VCO.

In yet another aspect, a wireless communication system includes a remote transmitter and a beam-steering system. The beam-steering system includes an antenna array including a number of antenna elements. The antenna array is configured to receive a signal from the remote transmitter thereat. The beam-steering system also includes a coupled VCO array including a number of VCOs coupled to one another, a number of mixers, a number of PLLs and a number of sample and hold circuits. Each mixer of the number of mixers is configured to mix the received signal at an antenna element with an in-phase and a quadrature-phase LO signal from a particular VCO of the coupled VCO array. Each PLL of the number of PLLs is configured to receive an in-phase output of the each mixer corresponding to the particular VCO and a quadrature-phase output of a mixer corresponding to another VCO adjacent to the particular VCO as inputs thereto.

An output of the each PLL is fed back to the particular VCO. The in-phase and the quadrature-phase outputs of the number of mixers are configured to be driven from in-phase and quadrature-phase outputs of a transmit modulator instead of the number of PLLs being driven by the in-phase and the quadrature-phase outputs of the number of mixers. The antenna array is configured to transmit a signal in a direction of the remote transmitter based on the driving of the in-phase and the quadrature-phase outputs of the number of mixers from the transmit modulator. Each sample and hold circuit of the number of sample and hold circuits is configured to sense a servoed state related to phase relationships between LO signals from VCOs of the coupled VCO array and hold the servoed state during the transmission of the signal in the direction of the remote transmitter. The each sample and hold circuit is coupled in a feedback path between the output of the each PLL and the particular VCO.

Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which:

FIG. 6A is a process flow diagram detailing operations involved in realizing an adaptive transmit array for beam-steering, according to one or more embodiments;

Other features of the present embodiments will be apparent from the accompanying drawings and from the disclosure that follows.

DETAILED DESCRIPTION

Example embodiments, as described below, may be used to provide a method, a circuit and/or a system of an adaptive transmit array for beam-steering. Although the present embodiments have been described with reference to specific example embodiments, it will be evident that various modifications and changes may be made to these embodiments without departing from the broader spirit and scope of the various embodiments.

Beamforming may be a technique for electronically setting a direction of a Radio Frequency (RF) beam using fixed arrays of antenna apertures or antenna elements. The aforementioned antenna arrays may be one-dimensional, two-dimensional or three-dimensional. The electronic pointing of the RF beam may be performed for either transmission or reception of signals. Beamforming, or electronic direction setting of the RF beam, may typically be achieved through the introduction of differential phase shifts in signal paths coupled to each of the antenna apertures or antenna elements.

It should be noted that exemplary embodiments to be discussed herein are to be placed within the context of a receiver (e.g., wireless receiver), where Local Oscillator (LO) signal generation is required.

Figure 1:
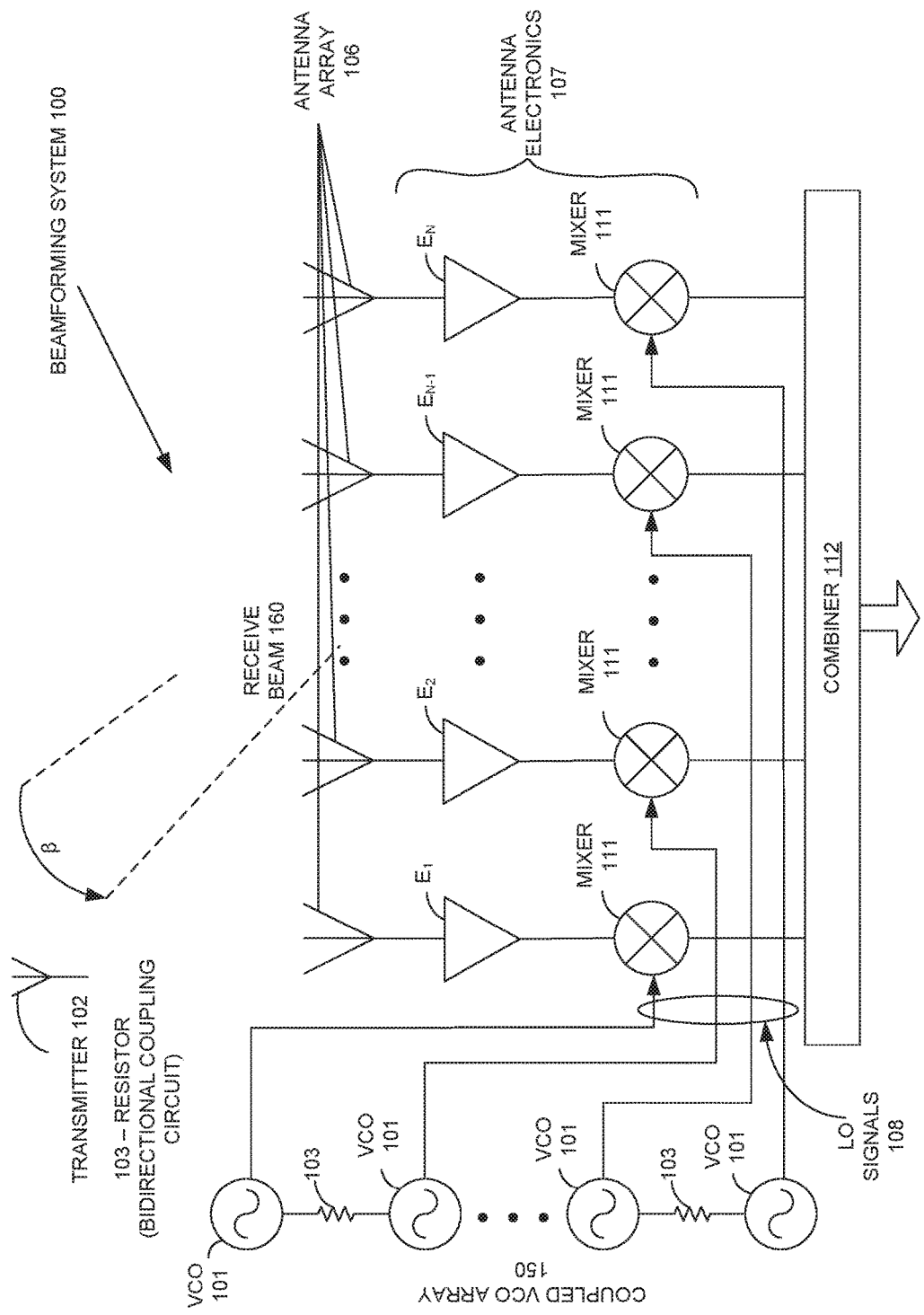
FIG. 1 is a schematic view of a beamforming system involving Local Oscillator (LO) scanned arrays.

A common technique to introduce the requisite phase shift in the signal path may involve generation of LO signals to mixers located in the signal paths. The aforementioned configuration may be called an LO scanned array. FIG. 1 shows a beamforming system 100 involving LO scanned arrays; LO scanned arrays may also be utilized to sense the direction from which a transmitter 102 is radiating energy. The antenna system including antenna array 106 and antenna electronics 107 may be utilized to reflect back the incident RF radiation in the direction of the source transmitter 102. The aforementioned antenna array 106 may be called a retro-directive array. FIG. 1 shows the automatic adaptive alignment of the receive beam (e.g., receive beam 160) toward the direction (e.g., rotating an angle β) of the transmitted RF signal.

In the LO scanned arrays of FIG. 1, LO signals 108 with differential phases may be generated and the differential phase LO signals 108 may be input to mixers 111 located in the signal paths. Antenna array 106 may be utilized in beam-steering or directing and/or focusing of transmitted/received signals. By directing the energy from or concentrating the energy incoming thereto, a higher efficiency may be achieved compared to a standard antenna implementation. This may result in the capability to transmit or receive signals corresponding to or from more distant receiving or transmitting radios, as discussed above.

A voltage controlled oscillator (VCO) 101 (see, e.g., FIGS. 1-5) may be an electronic oscillator configured to vary oscillation frequency thereof based on a voltage input. FIGS. 1-5 serve to describe the receiver (e.g., wireless receiver) context in which exemplary embodiments discussed herein may be practiced. The function of VCO 101 in LO signal generation (e.g., LO signal 108) as applied to receivers is well known to one of ordinary skill in the art. In order to generate differential phase LO signals, a coupled VCO array may be utilized. FIG. 1 shows beamforming system 100 including a coupled VCO array 150. Here, coupled VCO array 150 may include two or more VCOs 101 mutually injection locked to each other. Injection locking may be the state in which the two or more VCOs 101 exchange oscillatory energy sufficient enough to lock to a same frequency. Injection locking may be accomplished based on coupling VCOs 101 together through a bidirectional coupling circuit (e.g., resistor 103; other bidirectional coupling circuits 103 may also be used instead).

The outputs of mixing of LO signals 108 with signals from antenna elements of antenna array 106 may be combined at combiner 112 (e.g., a combiner circuit). There may be various ways to sense the direction of the remote transmitter 102, and to servo the LO phase relationships in the LO scanned array to better receive the remote signal, or to transmit energy back in the direction of the remote signal. The aforementioned ways may also be employed to track a remote transmitter in motion relative to the retro-directive array discussed above.

Figure 2:
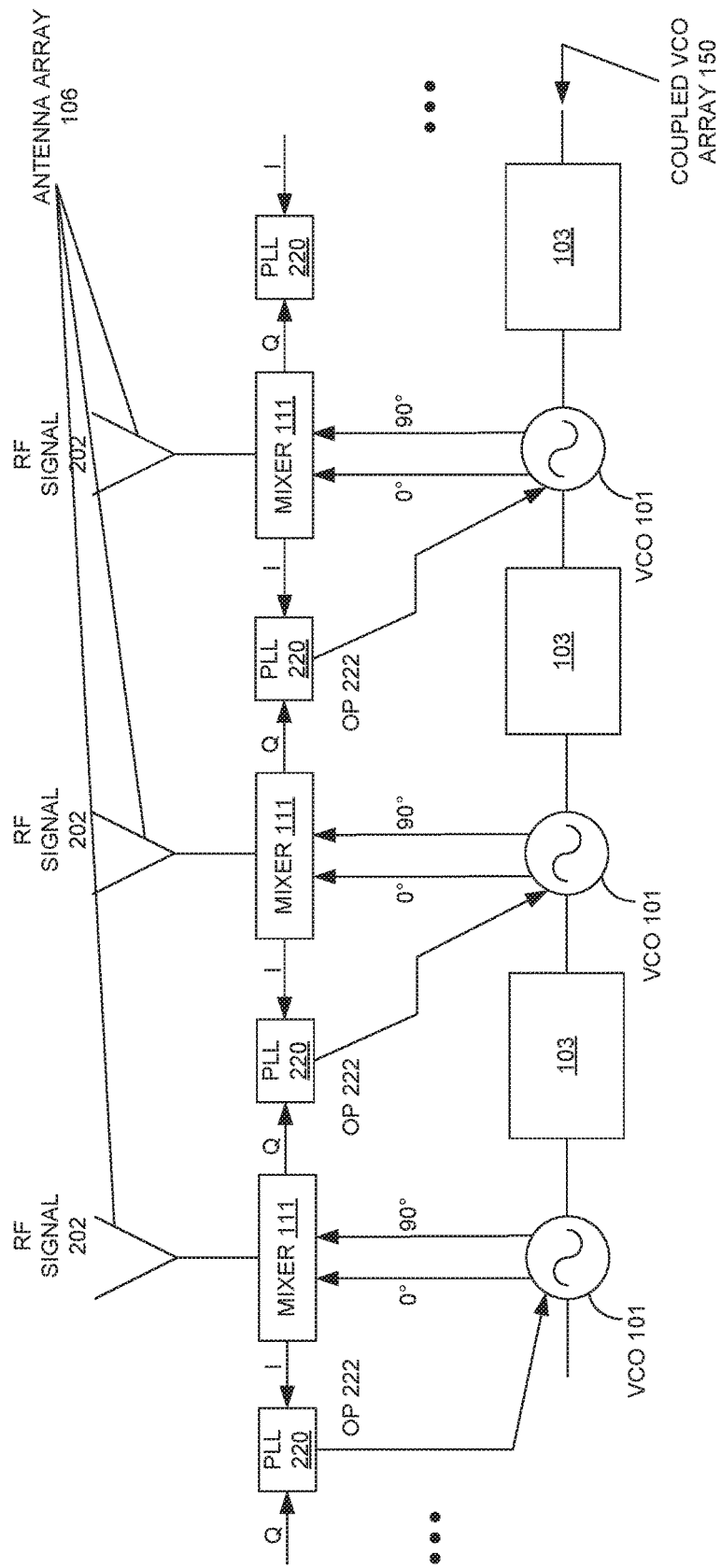
FIG. 2 is a schematic view of servoing a beamforming system.
Figure 3:
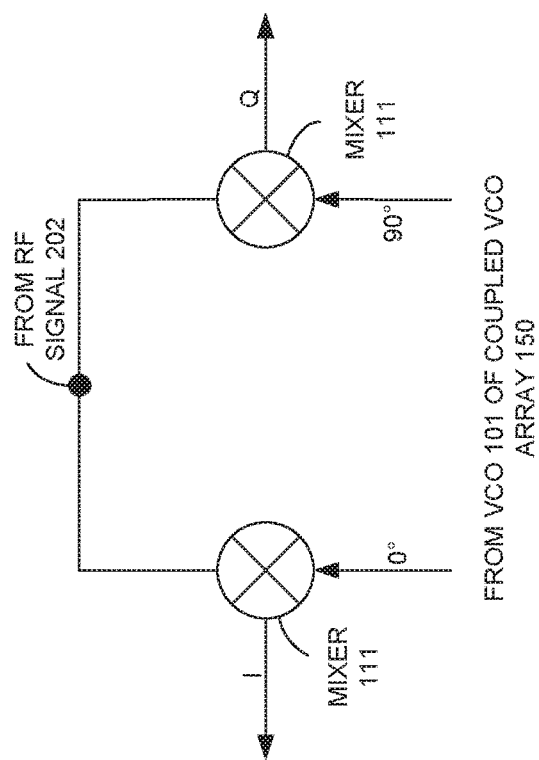
FIG. 3 is a schematic view of mixing of a received RF signal with in-phase (I) and quadrature-phase (Q) LO signal components from a coupled VCO array of the beamforming system of FIG. 2.

FIG. 2 shows servoing a beamforming system (e.g., beamforming system 100). Here, RF signals 202 (e.g., from transmitter 102) may be incident on antenna array 106. RF signals 202 may be received and mixed (e.g., through mixer 111(s); see also FIG. 3) with in-phase (I) and quadrature-phase (Q) LO signals 108 from coupled VCO array 150. Appropriate elements are analogous to the counterparts thereof in FIG. 1. The resulting in-phase (I) outputs may be compared to the quadrature-phase (Q) outputs of a neighboring element in a Phase Locked Loop (PLL) 220. PLL 220 may include a phase detector and a filter; the constituent elements of PLL 220 are well known to one skilled in the art. Detailed discussion thereof, therefore, has been skipped for the sake of convenience and brevity. The output of PLL 220 (OP 222) may then be fed back as an input to coupled VCO array 150 (e.g., to a corresponding VCO 101).

The process of I/Q down-converting RF signals, comparing phases of a 0 degree output of one down-converted RF input to the 90 degree output of an adjacent down-converted RF input, filtering, and feeding back into one of the VCOs 101 of coupled VCO array 150 may create a servo loop that senses the direction of a remote transmitter 102 and electronically points antenna array 106 to better receive the remotely transmitted signal (e.g., RF signal 202).

Figure 4:
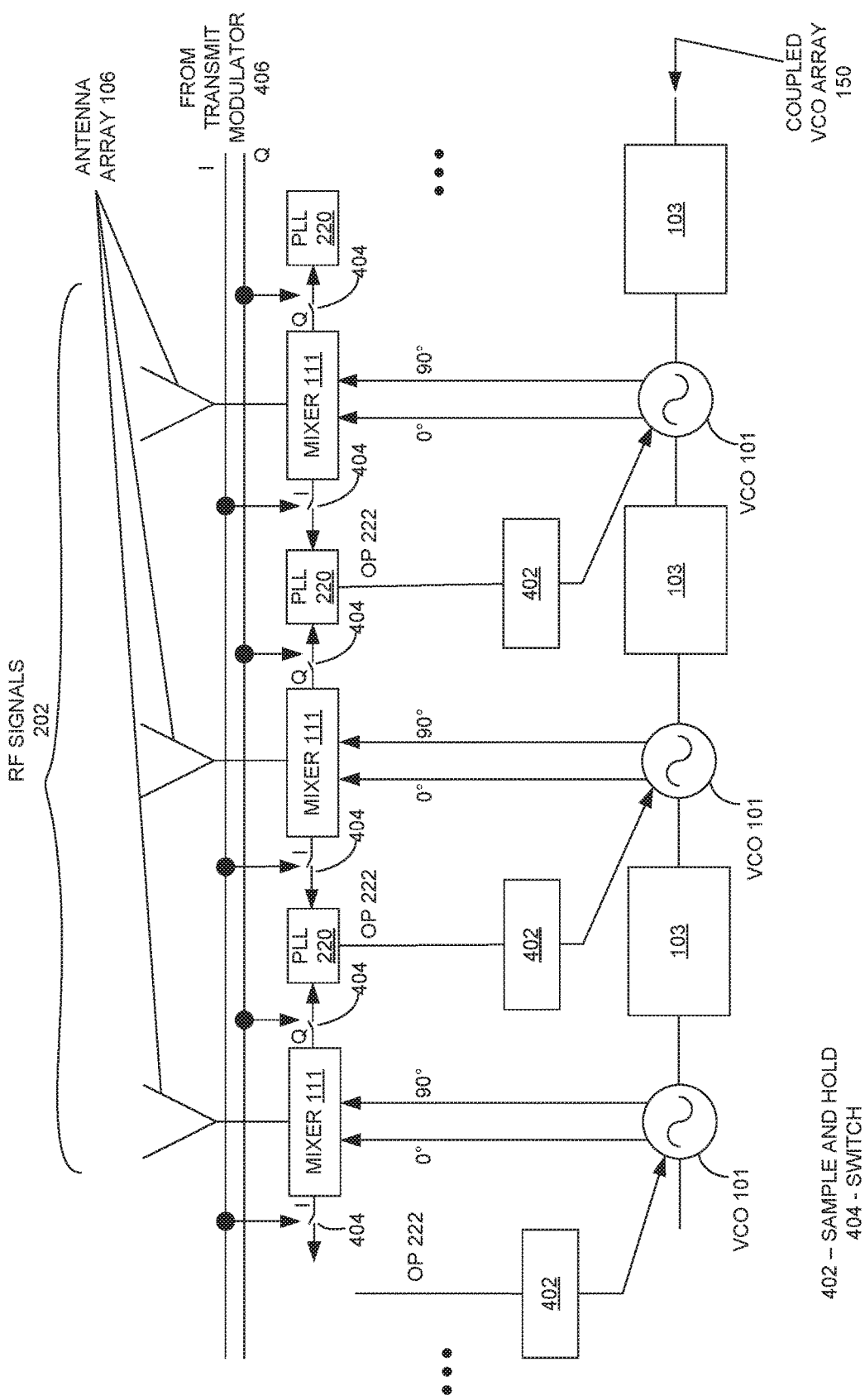
FIG. 4 is a schematic view of a modified servo arrangement of the beamforming system of FIG. 3, according to one or more embodiments.
Figure 5:
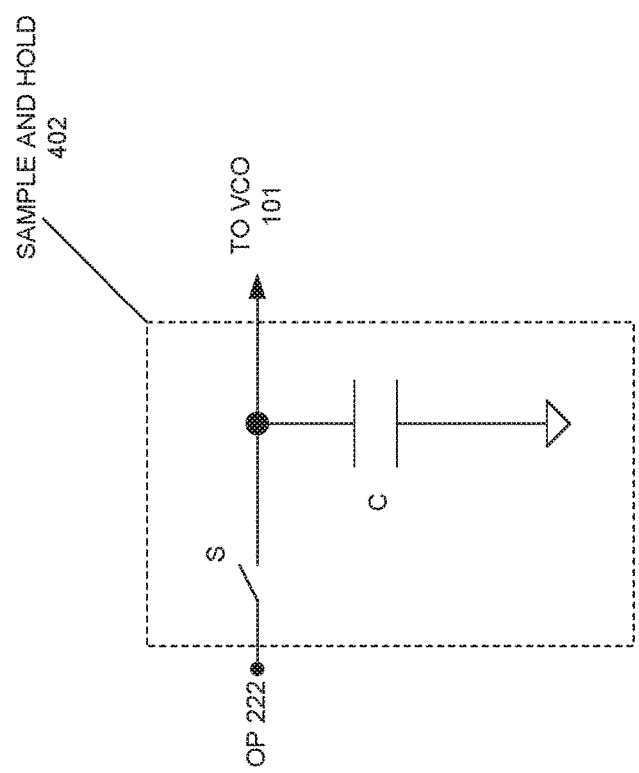
FIG. 5 is a schematic view of a sample and hold circuit of the modified servo arrangement of FIG. 4, according to one or more embodiments.

In one or more embodiments, concepts related to the abovementioned automatic receive system may also be utilized in transmitting signal(s) back to the remote transmitter 102. By utilizing the servoed array setting, the same system may be utilized to transmit energy back at the remote transmitter 102. FIG. 4 shows a modified servo arrangement of the beamforming system of FIG. 3, according to one or more embodiments. Here, in one or more embodiments, a sample and hold circuit 402 may be coupled in series with OP 222. In one or more embodiments, sample and hold circuit 402 may be implemented with merely a switch (S) and a capacitor (C) (see FIG. 5); alternately, in one or more embodiments, sample and hold circuit 402 may be more complex. In one or more embodiments, sample and hold circuits 402 may sense the state of the servoed array and then hold the servoed state during the transmission back to the remote transmitter 102.

In one or more embodiments, a switch 404 may be added to each of the I and Q outputs of I/Q mixers 111. In one or more embodiments, instead of driving PLLs 220, the I and Q outputs of mixers 111 may instead be driven from I and Q outputs of a transmit modulator 406. Here, the I and Q outputs of mixers 111 may become I and Q inputs, and mixers 111 may be utilized in a reverse direction to transmit. Thus, in one or more embodiments, it may be possible to transmit signals/information in the direction of the remote transmitter 102.

Exemplary embodiments, therefore, may provide for automatic servoing of and transmission from antenna array 106, with the servoing being fast and consuming low power. It will be appreciated that concepts disclosed herein may also be applied to two-dimensional or three-dimensional arrays of coupled VCOs 101, in addition to one-dimensional arrays thereof.

Figure 6B:
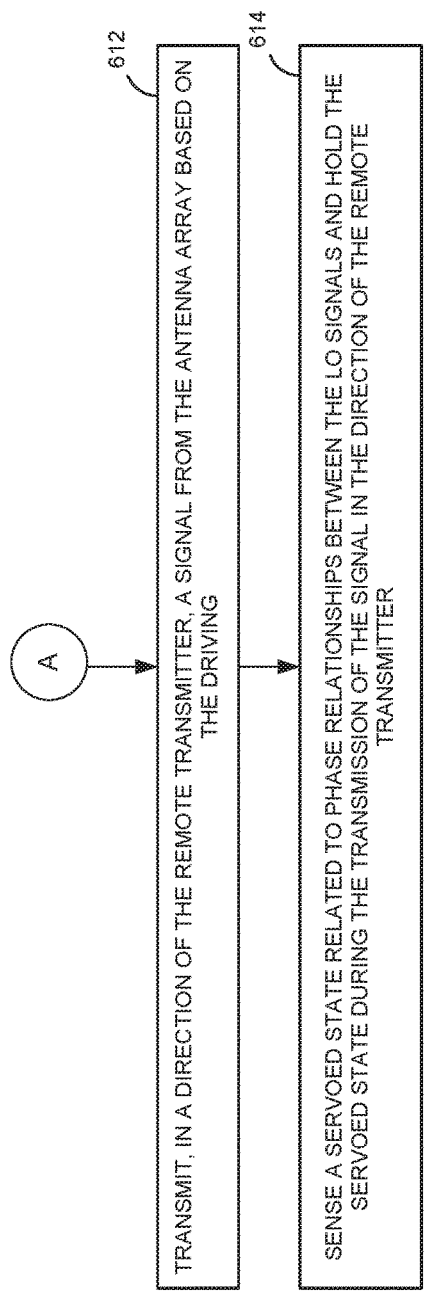
FIG. 6B is a continuation of the process flow diagram of FIG. 6A.

FIG. 6 shows a process flow diagram detailing operations involved in realizing an adaptive transmit array for beam-steering, according to one or more embodiments. In one or more embodiments, operation 602 may involve receiving a signal (e.g., RF signal 202) from a remote transmitter (e.g., transmitter 102) at antenna array 106 including a number of antenna elements. In one or more embodiments, operation 604 may involve mixing the received signal with in-phase and quadrature-phase LO signals 108 from VCOs 101 of coupled VCO array 150. In one or more embodiments, operation 606 may involve configuring each PLL 220 of a number of PLLs 220 to receive an in-phase output of the mixing corresponding to a VCO 101 of coupled VCO array 150 and a quadrature-phase output of the mixing corresponding to another VCO 101 adjacent to the VCO 101 in coupled VCO array 150 as inputs thereto.

In one or more embodiments, operation 608 may involve feeding back an output (e.g., OP 222) of the each PLL 220 to the VCO 101 of coupled VCO array 150. In one or more embodiments, operation 610 may involve driving the in-phase and the quadrature-phase outputs of the mixing from in-phase and quadrature-phase outputs of transmit modulator 406 instead of the each PLL 220 being driven by the in-phase and the quadrature-phase output of the mixing. In one or more embodiments, operation 612 may involve transmitting, in a direction of the remote transmitter 102, a signal from antenna array 106 based on the driving of the in-phase and the quadrature-phase outputs of the mixing from transmit modulator 406.

In one or more embodiments, operation 614 may then involve sensing a servoed state related to phase relationships between the LO signals 108 and holding the servoed state through a sample and hold circuit (e.g., sample and hold 402) coupled in a feedback path between the output of the each PLL 220 and the VCO 101 during the transmission of the signal in the direction of the remote transmitter 102.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
receiving a signal from a remote transmitter at an antenna array comprising a plurality of antenna elements;
mixing the received signal with in-phase and quadrature-phase Local Oscillator (LO) signals from Voltage Controlled Oscillators (VCOs) of a coupled VCO array;
configuring each Phase Locked Loop (PLL) of a plurality of PLLs to receive an in-phase output of the mixing corresponding to a VCO of the coupled VCO array and a quadrature-phase output of the mixing corresponding to another VCO adjacent to the VCO in the coupled VCO array as inputs thereto;
feeding back an output of the each PLL to the VCO of the coupled VCO array;
driving the in-phase and the quadrature-phase outputs of the mixing from in-phase and quadrature-phase outputs of a transmit modulator instead of the each PLL being driven by the in-phase and the quadrature-phase output of the mixing;
transmitting, in a direction of the remote transmitter, a signal from the antenna array based on the driving of the in-phase and the quadrature-phase outputs of the mixing from the transmit modulator; and
sensing a servoed state related to phase relationships between the LO signals and holding the servoed state through a sample and hold circuit coupled in a feedback path between the output of the each PLL and the VCO during the transmission of the signal in the direction of the remote transmitter.

2. The method of claim 1, comprising implementing the sample and hold circuit with a switch and a capacitor.

3. The method of claim 1, further comprising coupling a switch each in a path of the in-phase output of the mixing corresponding to the VCO of the coupled VCO array and in another path of the quadrature-phase output of the mixing corresponding to the VCO, the path being coupled to the each PLL and the another path being coupled to another PLL.

4. The method of claim 1, further comprising injection locking two or more VCOs of the coupled VCO array to each other.

5. The method of claim 1, further comprising coupling a VCO of the coupled VCO array to another VCO thereof through a bidirectional coupling circuit.

6. The method of claim 1, comprising providing one of: a one-dimensional, a two-dimensional and a three-dimensional VCO array as the coupled VCO array.

7. The method of claim 1, comprising beam-steering the signal from the remote transmitter back thereto, the beam-steered signal being the signal transmitted from the antenna array in the direction of the remote transmitter.

8. A beam-steering system comprising:
an antenna array comprising a plurality of antenna elements, the antenna array being configured to receive a signal from a remote transmitter thereat;

a coupled VCO array comprising a plurality of VCOs coupled to one another;

a plurality of mixers, each of which is configured to mix the received signal at an antenna element with an in-phase and a quadrature-phase LO signal from a particular VCO of the coupled VCO array;

a plurality of PLLs, each of which is configured to receive an in-phase output of the each mixer corresponding to the particular VCO and a quadrature-phase output of a mixer corresponding to another VCO adjacent to the particular VCO as inputs thereto, an output of the each PLL being fed back to the particular VCO, the in-phase and the quadrature-phase outputs of the plurality of mixers being configured to be driven from in-phase and quadrature-phase outputs of a transmit modulator instead of the plurality of PLLs being driven by the in-phase and the quadrature-phase outputs of the plurality of mixers, and the antenna array being configured to transmit a signal in a direction of the remote transmitter based on the driving of the in-phase and the quadrature-phase outputs of the plurality of mixers from the transmit modulator; and a plurality of sample and hold circuits, each of which is configured to sense a servoed state related to phase relationships between LO signals from VCOs of the coupled VCO array and hold the servoed state during the transmission of the signal in the direction of the remote transmitter, the each sample and hold circuit being coupled in a feedback path between the output of the each PLL and the particular VCO.

9. The beam-steering system of claim 8, wherein the each sample and hold circuit is implemented with a switch and a capacitor.

10. The beam-steering system of claim 8, further comprising a switch coupled each in a path of the in-phase output of the each mixer corresponding to the particular VCO of the coupled VCO array and in another path of the quadrature-phase output of the each mixer corresponding to the particular VCO, the path being coupled to the PLL and the another path being coupled to another PLL.

11. The beam-steering system of claim 8, wherein two or more VCOs of the coupled VCO array are configured to be injection locked to each other.

12. The beam-steering system of claim 8, further comprising a plurality of bidirectional coupling circuits, each of which is configured to couple a VCO of the coupled VCO array to another VCO thereof.

13. The beam-steering system of claim 8, wherein the coupled VCO array is one of: a one-dimensional, a two-dimensional and a three-dimensional VCO array.

14. The beam-steering system of claim 8, wherein the signal from the remote transmitter is configured to be beam-steered back thereto, the beam-steered signal being the signal transmitted from the antenna array in the direction of the remote transmitter.

15. A wireless communication system comprising:
a remote transmitter; and
a beam-steering system comprising:
an antenna array comprising a plurality of antenna elements, the antenna array being configured to receive a signal from the remote transmitter thereat;

a coupled VCO array comprising a plurality of VCOs coupled to one another;

a plurality of mixers, each of which is configured to mix the received signal at an antenna element with an in-phase and a quadrature-phase LO signal from a particular VCO of the coupled VCO array;

a plurality of PLLs, each of which is configured to receive an in-phase output of the each mixer corresponding to the particular VCO and a quadrature-phase output of a mixer corresponding to another VCO adjacent to the particular VCO as inputs thereto, an output of the each PLL being fed back to the particular VCO, the in-phase and the quadrature-phase outputs of the plurality of mixers being configured to be driven from in-phase and quadrature-phase outputs of a transmit modulator instead of the plurality of PLLs being driven by the in-phase and the quadrature-phase outputs of the plurality of mixers, and the antenna array being configured to transmit a signal in a direction of the remote transmitter based on the driving of the in-phase and the quadrature-phase outputs of the plurality of mixers from the transmit modulator; and a plurality of sample and hold circuits, each of which is configured to sense a servoed state related to phase relationships between LO signals from VCOs of the coupled VCO array and hold the servoed state during the transmission of the signal in the direction of the remote transmitter, the each sample and hold circuit being coupled in a feedback path between the output of the each PLL and the particular VCO.

16. The wireless communication system of claim 15, wherein the each sample and hold circuit of the beam-steering system is implemented with a switch and a capacitor.

17. The wireless communication system of claim 15, wherein the beam-steering system further comprises a switch coupled each in a path of the in-phase output of the each mixer corresponding to the particular VCO of the coupled VCO array and in another path of the quadrature-phase output of the each mixer corresponding to the particular VCO, the path being coupled to the PLL and the another path being coupled to another PLL.

18. The wireless communication system of claim 15, wherein two or more VCOs of the coupled VCO array of the beam-steering system are configured to be injection locked to each other.

19. The wireless communication system of claim 15, wherein the beam-steering system further comprises a plurality of bidirectional coupling circuits, each of which is configured to couple a VCO of the coupled VCO array to another VCO thereof.

20. The wireless communication system of claim 15, wherein the signal from the remote transmitter is configured to be beam-steered back thereto through the beam-steering system, the beam-steered signal being the signal transmitted from the antenna array of the beam-steering system in the direction of the remote transmitter.

* * * * *